US012802907B2

(12) United States Patent
Kang et al.

(10) Patent No.: US 12,802,907 B2
(45) Date of Patent: Nov. 17, 2026

(54) LUMINOUS MEMBRANE KEYBOARD WITH LIGHT-GUIDING SPACER

(71) Applicant: SUZHOU LUUMII LTD., Suzhou City (CN)

(72) Inventors: Chen-Fang Kang, New Taipei City (TW); Hsin-Chih Liang, New Taipei City (TW); Yu-Kai Lin, New Taipei City (TW)

(73) Assignee: SUZHOU LUUMII LTD., Suzhou City (CN)

( * ) Notice: Subject to any disclaimer, the term of this patent is extended or adjusted under 35 U.S.C. 154(b) by 0 days.

(21) Appl. No.: 19/416,800

(22) Filed: Dec. 11, 2025

(65) Prior Publication Data

US 2026/0171333 A1 Jun. 18, 2026

(30) Foreign Application Priority Data

Dec. 13, 2024 (TW) ................................ 113213788

(51) Int. Cl.
*H01H 13/83* (2006.01)
*F21V 8/00* (2006.01)
*H01H 13/52* (2006.01)

(52) U.S. Cl.
CPC ........... *H01H 13/83* (2013.01); *G02B 6/0065* (2013.01); *G02B 6/0091* (2013.01); *H01H 13/52* (2013.01)

(58) Field of Classification Search
CPC ...................................................... H01H 13/83
See application file for complete search history.

(56) References Cited

U.S. PATENT DOCUMENTS

| | | | | |
|---|---|---|---|---|
| 2011/0168538 A1* | 7/2011 | Hwa | ...................... | H01H 13/83 200/5 A |
| 2012/0080297 A1* | 4/2012 | Takeuchi | .............. | H01H 13/83 200/310 |
| 2013/0134021 A1* | 5/2013 | Chen | ...................... | H01H 13/83 200/5 A |
| 2017/0011870 A1* | 1/2017 | Liang | .................. | H01H 13/704 |
| 2017/0294278 A1* | 10/2017 | Chen | .................... | H01H 13/023 |

* cited by examiner

*Primary Examiner* — Alexander K Garlen
(74) *Attorney, Agent, or Firm* — HDLS IPR SERVICES; Chun-Ming Shih

(57) ABSTRACT

A luminous membrane keyboard with a light-guiding spacer includes: a key, a first layer, a second layer, the light-guiding spacer, and at least one insulating pad. The key includes a protrusion. The first layer includes a first circuit film and a first electrode layer attached to each other. The second layer includes a second circuit film and a second electrode layer attached to each other. The light-guiding spacer includes at least one opening and is stacked between the first and second layers. The key is located outside the first layer or the second layer, and its protrusion corresponds to the opening. The insulating pad is arranged between the first circuit film and the first electrode layer, causing the first layer to form a first raised portion. The first raised portion and the second layer are spaced apart from and opposite to each other within the opening.

9 Claims, 1 Drawing Sheet

LUMINOUS MEMBRANE KEYBOARD WITH LIGHT-GUIDING SPACER

BACKGROUND OF THE DISCLOSURE

Technical Field

The present disclosure relates to a luminous membrane keyboard, and more particularly, to a luminous membrane keyboard with a light-guiding spacer.

Description of Related Art

In a related art membrane keyboard, a spacer layer is typically disposed between an upper layer and a lower layer. The spacer layer, made of an insulating material, includes an opening. A key is disposed on the upper layer, so that when the key is pressed, a protrusion of the key presses against the upper layer, causing the upper layer to bend downward to contact the lower layer and establish conduction.

However, related-art luminous membrane keyboards either have poor light-guiding effects or no light-guiding capabilities at all, necessitating the addition of a separate light-guiding structure.

To achieve better light-guiding effect, a material having superior light-guiding properties must be used for the spacer layer. However, a spacer made of such material tends to be thicker, resulting in a longer key-press stroke. Consequently, the aperture of the opening in the spacer must be enlarged; otherwise, prolonged or excessive pressing by the user may damage the membrane. Yet, enlarging the aperture alters the tactile feel of pressing, which has long been a major technical challenge for luminous membrane keyboards.

Accordingly, overcoming the foregoing drawbacks of the related art is a problem that the inventor of the present disclosure seeks to solve.

SUMMARY OF THE DISCLOSURE

An object of the present disclosure is to provide a luminous membrane keyboard with a light-guiding spacer, which achieves improved light-guiding effect while maintaining the original tactile feel during key pressing.

To achieve the above object, the present disclosure provides a luminous membrane keyboard with a light-guiding spacer, including: a key provided with a protrusion; a first layer, including a first circuit film and a first electrode layer, the first electrode layer being attached to the first circuit film; a second layer, including a second circuit film and a second electrode layer, the second electrode layer being attached to the second circuit film; a light-guiding spacer including at least one opening, the light-guiding spacer being interposed between the first layer and the second layer, and the three being stacked on each other, the key being disposed outside one of the first layer and the second layer, and the protrusion being arranged corresponding to the opening; and at least one insulating pad, the insulating pad being disposed between the first circuit film and the first electrode layer, wherein the first layer forms a first raised portion within the opening via the disposition of the insulating pad, and the first raised portion and the second layer are spaced apart from and opposite to each other within the opening.

Compared with the related art, the present disclosure provides the following effects: it achieves better light-guiding effect, maintains the original tactile feel of pressing, and does not require enlarging the aperture of the opening.

DETAILED DESCRIPTION

The detailed description and technical content of the present disclosure are described below with reference to the drawings. However, the accompanying drawings are provided for reference and illustration only and are not intended to limit the present disclosure.

Figure 1:
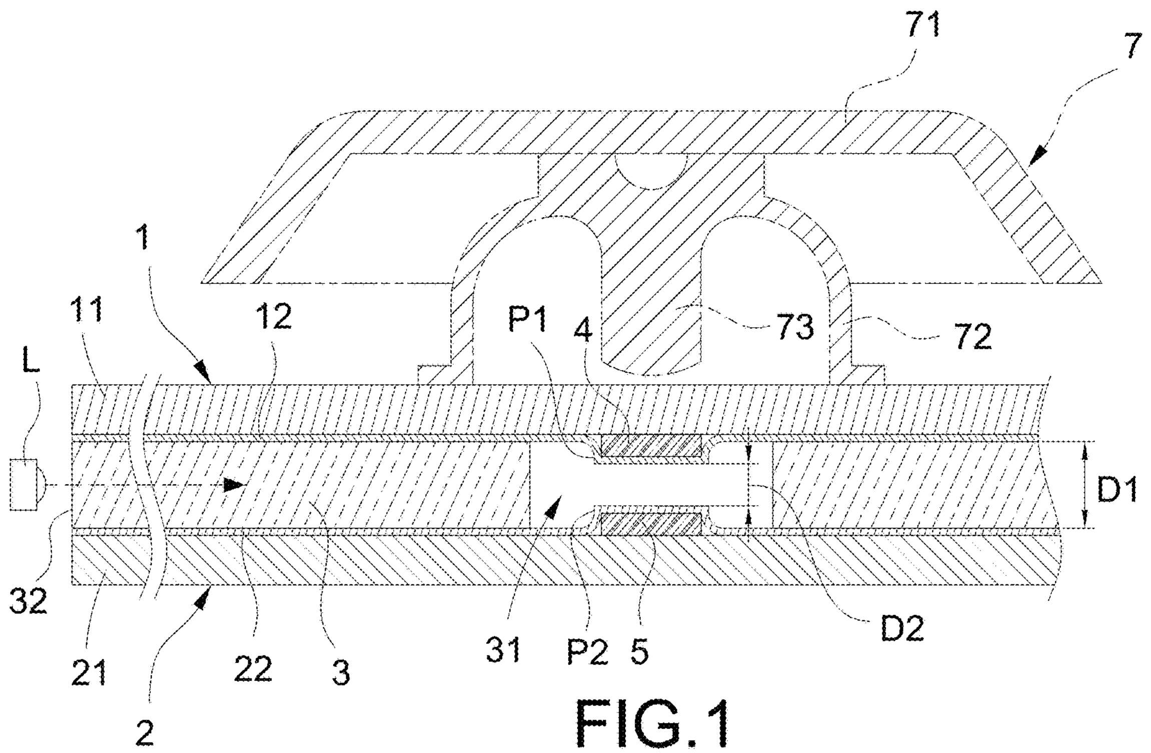
FIG. 1 is a schematic cross-sectional view of the luminous membrane keyboard of the present disclosure before being pressed.

The present disclosure provides a luminous membrane keyboard with a light-guiding spacer, which emits light when illuminated by at least one light source L, as shown in FIG. 1. The luminous membrane keyboard with a light-guiding spacer (abbreviated as: luminous membrane keyboard) of the present disclosure includes: a membrane switch assembly (not labeled with reference numerals) and at least one key 7. The membrane switch assembly includes: a first layer 1, a second layer 2, a light-guiding spacer 3, and a pair of insulating pads including a first insulating pad 4 and a second insulating pad 5. It should be noted that in the membrane switch assembly, component symbols are not labeled on either surface of each component described later.

As shown in FIG. 1, the key 7 includes a keycap 71, an elastomer 72, and a protrusion 73 connected to one another. The key 7 is supported on the membrane switch assembly by its elastomer 72, and the protrusion 73 is located in the middle of the elastomer 72.

The first layer 1 includes a first circuit film 11 and a first electrode layer 12. The first electrode layer 12 is disposed on the first circuit film 11 in a flatly attached manner.

The second layer 2 includes a second circuit film 21 and a second electrode layer 22. The second electrode layer 22 is disposed on the second circuit film 21 in a flatly attached manner.

The aforementioned pair of insulating pads, including the first insulating pad 4 and the second insulating pad 5, are both made of non-conductive insulating material, as their names imply.

The first insulating pad 4 is disposed between the first circuit film 11 and the first electrode layer 12. Specifically, the first insulating pad 4 is first disposed on one surface of the first circuit film 11, and then the first electrode layer 12 is flatly attached to the same surface, so that the first electrode layer 12 forms a first raised portion P1 that protrudes with respect to the first layer 1 at the location where the first insulating pad 4 is disposed.

The second insulating pad 5 is disposed between the second circuit film 21 and the second electrode layer 22. Specifically, the second insulating pad 5 is also first disposed on one surface of the second circuit film 21, and then the second electrode layer 22 is flatly attached to the same surface, so that the second electrode layer 22 also forms a second raised portion P2 that protrudes with respect to the second layer 2 at the location where the second insulating pad 5 is disposed. The first electrode layer 12 of the first layer 1 and the second electrode layer 22 of the second layer 2 are spaced apart from and face each other.

In detail, the first insulating pad 4 supports the first electrode layer 12 within the first layer 1 in the direction of the second raised portion P2, and the first electrode layer 12 forms the first raised portion P1 as a result of being supported in this way. The second insulating pad 5 supports the second electrode layer 22 within the second layer 2 in the direction of the first raised portion P1, and the second electrode layer 22 forms the second raised portion P2 as a result of being supported in this way.

The light-guiding spacer 3 is made of an insulating material and is interposed between the first layer 1 and the second layer 2. That is, the first layer 1, the second layer 2, and the light-guiding spacer 3 are stacked together such that the light-guiding spacer 3 is sandwiched between the first layer 1 and the second layer 2, thereby defining a first distance between the first electrode layer 12 and the second electrode layer 22 through the light-guiding spacer 3.

The light-guiding spacer 3 includes one surface and another surface opposite to each other, and a plurality of thickness edges 32 connecting the two surfaces. The light-guiding spacer 3 is provided with at least one opening 31, which extends from one surface of the light-guiding spacer 3 through to the other surface. The aforementioned first raised portion P1 and second raised portion P2 are both positioned within the opening 31 and are spaced apart from and opposite to each other. The direction in which the first raised portion P1 protrudes with respect to the first layer 1 is opposite to the direction in which the second raised portion P2 protrudes with respect to the second layer 2. A second distance is defined between the first raised portion P1 and the second raised portion P2, the second distance being smaller than the first distance, and this second distance corresponds to the pressing distance D2 when the user presses.

It should be noted that, to provide a better light-guiding effect, the light-guiding spacer 3 may be made of polycarbonate (PC). While the PC light-guiding spacer 3 provides better light-guiding effect, its thickness (i.e., spacer thickness D1, which is equal to the aforementioned first distance) is greater than the thickness of a polyethylene terephthalate (PET) light guide plate.

The aforementioned key 7 is disposed on the membrane switch assembly and supported by its elastomer 72 on the first circuit film 11 or the second circuit film 21. In this embodiment, the key 7 supported on the first circuit film 11 is taken as an example for description, and the protrusion 73 is arranged corresponding to the opening 31. Preferably, the protrusion 73, the first raised portion P1, and the second raised portion P2 are all located on the same straight line.

The aforementioned light source L is disposed corresponding to one of the thickness edges 32 of the light-guiding spacer 3, so that light emitted from the light source L enters the light-guiding spacer 3 through the thickness edge 32.

Figure 2:
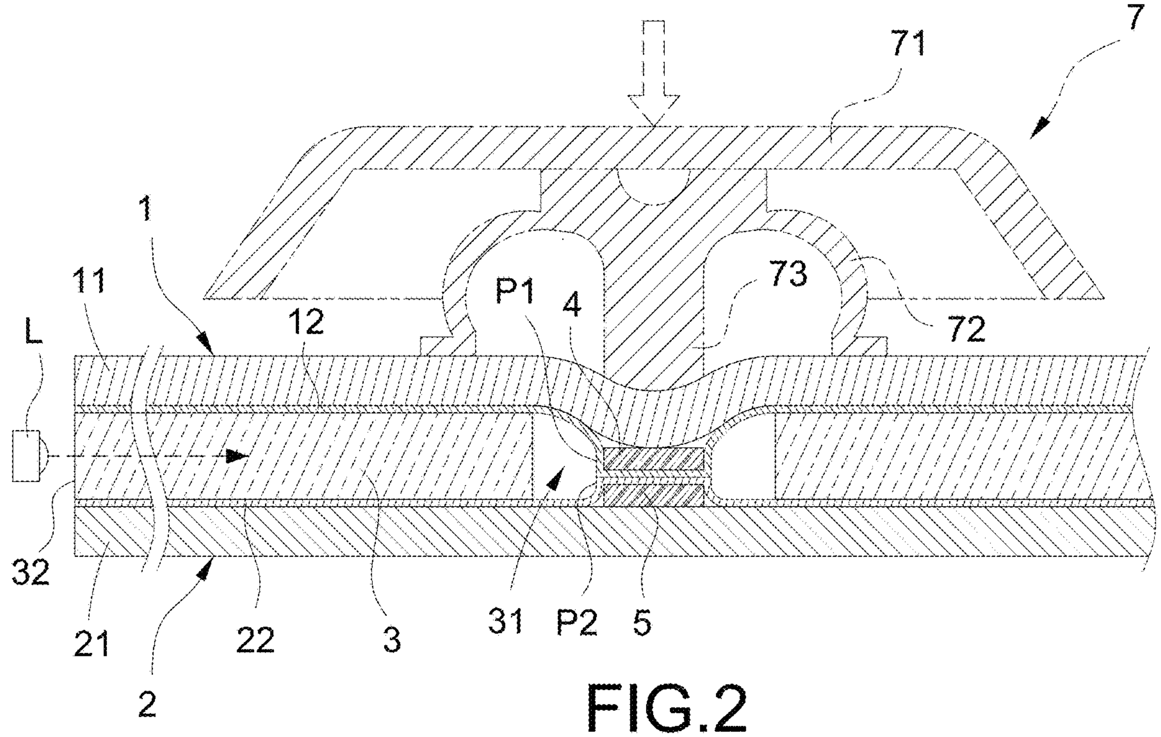
FIG. 2 is a schematic cross-sectional view of the luminous membrane keyboard of the present disclosure after being pressed.

As shown in FIG. 2, in this way, when the user presses the keycap 71, the elastomer 72 is elastically compressed, which in turn drives the protrusion 73 to press against the membrane switch assembly, causing it to indent, so that the first raised portion P1 and the second raised portion P2 contact each other via the first electrode layer 12 and the second electrode layer 22 to establish conduction.

Thereby, as shown in FIG. 1 and FIG. 2, although the light-guiding spacer 3 with good light-guiding effect has a spacer thickness D1 (between approximately 0.05-0.3 mm, preferably 0.15 mm) that is greater than the thickness of a PET light guide plate (0.038 mm), leading to a longer press stroke, the present disclosure, by adding the first insulating pad 4 and the second insulating pad 5 within the first layer 1 and the second layer 2, allows the distance between the first raised portion P1 and the second raised portion P2 (i.e., the pressing distance D2) to be shortened to 0.038 mm. That is, the press stroke remains the same as usual. Since the press stroke is the same, the aperture of the opening 31 does not need to be enlarged. Therefore, the luminous membrane keyboard of the present disclosure achieves better light-guiding effect while also maintaining the original (usual) tactile feel of pressing.

It should be noted that, in other embodiments not shown in the drawings, the luminous membrane keyboard of the present disclosure may be provided with multiple keys 7. Correspondingly, a matching number of pairs of insulating pads and a matching number of openings 31 are also included.

In yet another embodiment not shown in the drawings, only one of the first insulating pad 4 and the second insulating pad 5 may be disposed, such that only the first layer 1 (or only the second layer 2) forms the first raised portion P1 (or the second raised portion P2) within the opening 31. In this embodiment, although there is only the first raised portion P1 (or only the second raised portion P2), as long as the first raised portion P1 (or the second raised portion P2) has a sufficient protrusion length, the aforementioned objects and effects of the present disclosure are still achieved.

In summary, the luminous membrane keyboard with a light-guiding spacer of the present disclosure indeed achieves the intended purpose of use and effects, and also overcomes the deficiencies of the related art; therefore, a patent application is filed.

The above descriptions are merely preferred embodiments of the present disclosure and are not intended to limit the patent scope of the present disclosure. Any equivalent structural changes made using the content of the specification and drawings of the present disclosure shall be deemed to fall within the scope of rights of the present disclosure, which is hereby stated.

What is claimed is:

1. A luminous membrane keyboard with a light-guiding spacer, comprising:

a key comprising a protrusion;

a first layer comprising a first circuit film and a first electrode layer, the first electrode layer being attached to the first circuit film;

a second layer comprising a second circuit film and a second electrode layer, the second electrode layer being attached to the second circuit film;

a light-guiding spacer comprising at least one opening, the light-guiding spacer being interposed between the first layer and the second layer, wherein the light-guiding spacer, the first layer, and the second layer are stacked on each other, the key is disposed outside one of the first layer and the second layer, and the protrusion is arranged corresponding to the at least one opening; and at least one insulating pad, the at least one insulating pad being disposed between the first circuit film and the first electrode layer, wherein the first layer forms a first raised portion within the opening via the disposition of the insulating pad, and the first raised portion and the second layer are spaced apart from and opposite to each other within the opening.

2. The luminous membrane keyboard with the light-guiding spacer according to claim 1, wherein the at least one insulating pad comprises two insulating pads, the two insulating pads being respectively disposed between the first circuit film and the first electrode layer, and between the second circuit film and the second electrode layer, wherein the first layer forms the first raised portion within the opening via the disposition of one of the two insulating pads, the second layer forms a second raised portion within the opening via the disposition of the other of the two insulating pads, and the first raised portion and the second raised portion are spaced apart from and opposite to each other.

3. The luminous membrane keyboard with the light-guiding spacer according to claim 2, wherein one of the two insulating pads supports the first electrode layer within the first layer to form the first raised portion, and the other of the two insulating pads supports the second electrode layer within the second layer to form the second raised portion.

4. The luminous membrane keyboard with the light-guiding spacer according to claim 2, wherein the first raised portion protrudes from the first electrode layer toward the second raised portion, and the second raised portion protrudes from the second electrode layer toward the first raised portion.

5. The luminous membrane keyboard with the light-guiding spacer according to claim 2, wherein a first distance is defined between the first electrode layer and the second electrode layer via the light-guiding spacer, and a second distance is defined between the first raised portion and the second raised portion, the second distance being smaller than the first distance.

6. The luminous membrane keyboard with the light-guiding spacer according to claim 2, wherein the protrusion, the first raised portion, and the second raised portion are aligned on a same straight line.

7. The luminous membrane keyboard with the light-guiding spacer according to claim 1, wherein a thickness of the light-guiding spacer is in a range from 0.05 mm to 0.3 mm.

8. The luminous membrane keyboard with the light-guiding spacer according to claim 1, wherein the light-guiding spacer is made of polycarbonate.

9. The luminous membrane keyboard with the light-guiding spacer according to claim 1, further comprising at least one light source, wherein the light-guiding spacer includes a plurality of thickness edges, and the at least one light source emits light toward one of the plurality of thickness edges.

* * * * *